Feb. 2, 1943.  W. R. HUME  2,309,903
COATING AND MANUFACTURE OF PIPES
Filed July 14, 1939  2 Sheets-Sheet 1
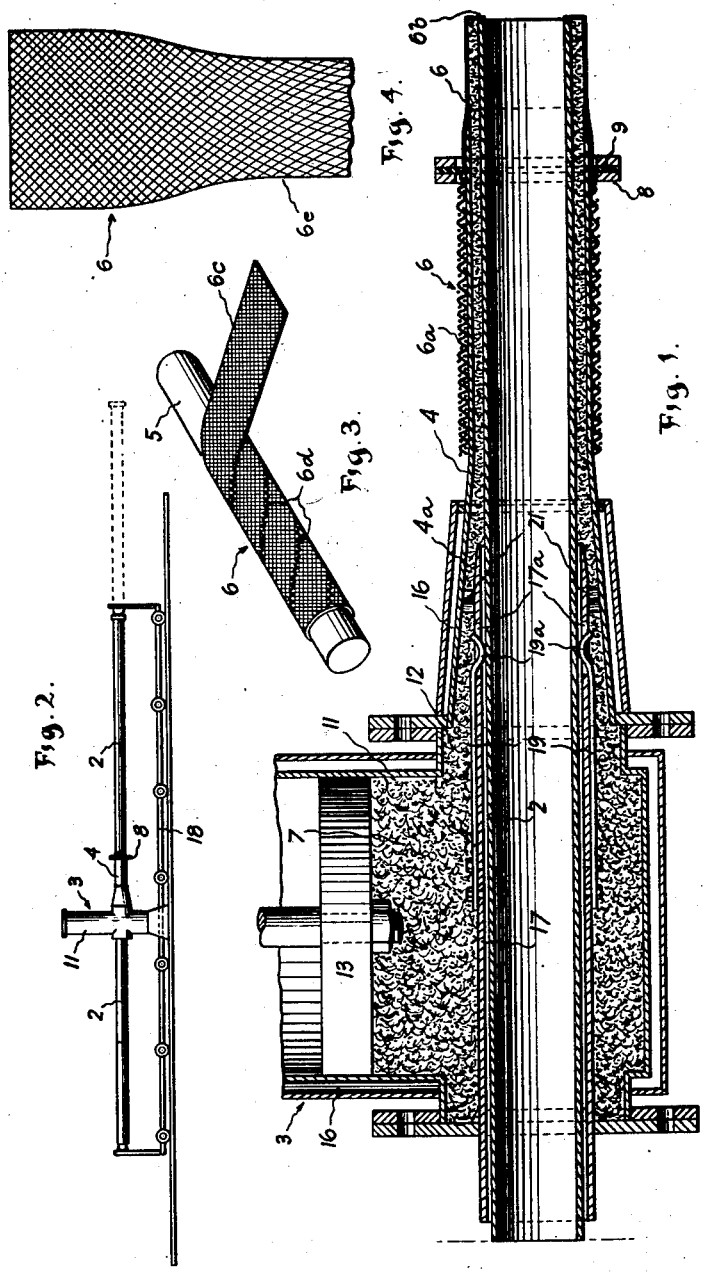
INVENTOR
W. R. HUME
BY
Young, Emery & Thompson
ATTYS.

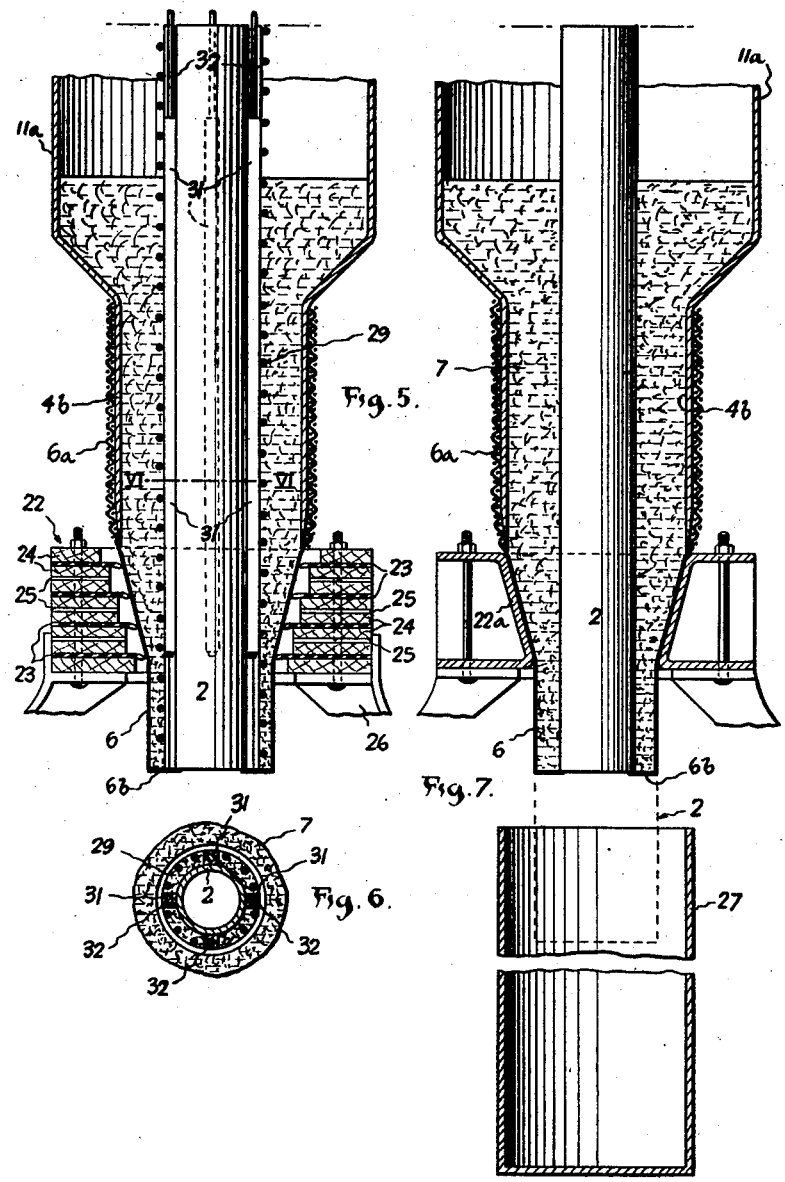

Patented Feb. 2, 1943

2,309,903

UNITED STATES PATENT OFFICE 2,309,903

COATING AND MANUFACTURE OF PIPES

Walter Reginald Hume, Melbourne, Victoria, Australia, assignor to Hume Pipe Company (Australia) Limited, Melbourne, Victoria, Australia Application July 14, 1939, Serial No. 284,545
In Australia August 2, 1938

23 Claims. (Cl. 154—1)

This invention relates to the coating and manufacture of pipes, columns and similar hollow bodies with materials of a cementitious, bituminous or other plastic nature, such, for example, as mixtures of asbestos and cement or of asbestos and bitumen.

The invention is particularly applicable to the external coating of metal pipes with such cementitious or bituminous materials for the purpose of protecting the metal against corrosive and other deleterious influences, but, as will be apparent hereinafter, is also applicable to the manufacture of pipes or similar hollow bodies from such materials.

According to this invention we provide a method for coating and manufacturing pipes and the like from cementitious, bituminous or other suitable plastic materials; which comprises attaching a flexible sleeve of foraminous material such as hessian to one end of a pipe or a mandrel, arranging the sleeve to extend loosely around said pipe or mandrel so as to provide in association therewith an annular space, introducing the plastic material under the force of gravity or applied pressure into said annular space so that it travels towards that end of the pipe or mandrel to which the sleeve is attached, moving the pipe or mandrel in the same direction as the feed of the plastic material, and restraining free movement of the flexible sleeve so that it is progressively placed under tension from its attached end by and during movement of the pipe or mandrel, whereby an annular body of the plastic material is progressively built up in a lengthwise direction within said annular space and is compressed or moulded between said sleeve and the adjacent surface of said pipe or mandrel.

The pipe coating or forming material is thus effectively moulded and compressed about the pipe or mandrel and is allowed to set or season within the foraminous sleeve which may remain adhering to the moulded annular body and thus serve as a reinforcement and as a protection to the surface of the product during handling, transport and actual use.

A further feature of the invention resides in apparatus for carrying such method into practical effect, such apparatus comprising a sleeve formed of hessian or such-like flexible foraminous material adapted to be secured at one end to one end of a pipe or mandrel and to extend lengthwise exteriorly thereof in a loose condition in order to provide an annular moulding space, means for moving said pipe or mandrel, with the sleeve attached thereto, in a lengthwise direction, means for progressively placing said sleeve under tension and means for feeding plastic material lengthwise into said annular moulding space.

A still further feature of the invention resides in the provision of a flexible foraminous sleeve that is so constructed as to be capable of being contracted into concertina or bellows formation, and being extended and placed in tension in order to effect, or assist, compression or moulding of the plastic material as aforesaid.

Referring to the drawings which form part of this specification:

Figure 1 is a longitudinal sectional view of one form of apparatus suitable for moulding cementitious or bituminous material around the exterior of a metal pipe or mandrel according to one aspect of the invention.

Figure 2 is a side elevation on a reduced scale indicating diagrammatically a general lay out of apparatus similar to that of Figure 1.

Figure 3 is a perspective view illustrating one form of a foraminous sleeve that constitutes an important feature of the invention, the said figure also illustrating how such a sleeve may be manufactured from strip material.

Figure 4 is a fragmentary elevation of the flexible foraminous sleeve and depicts how it contracts in diameter when under tension in a lengthwise direction.

Figure 5 is a somewhat diagrammatic sectional elevation illustrating how the method may be carried out by arranging for a gravitational flow of the plastic material into the annular space between the foraminous sleeve and the pipe or mandrel.

Figure 6 is a section on line VI—VI of Figure 5.

Figure 7 is a view similar to Figure 5 but showing an adaptation of the invention more suitable for dealing with bituminous substances.

According to the embodiment illustrated in Figures 1 and 2, the article to be coated is, for example, shown as a metal pipe 2 and is movable longitudinally through a suitable extruding machine 3 provided with an elongated discharge nozzle 4. A sleeve 6 of suitable flexible foraminous material such, for instance, as hessian, that has been formed by sewing or weaving into a tube of the requisite diameter, as will be more particularly described hereinafter, is contracted in concertina or bellows fashion somewhat as indicated at 6a and is loosely applied around the extruder nozzle. One end of the sleeve is attached, as at 6b, to what may be termed the leading or forward end of the pipe 2.

The pipe is moved forwardly through the extruding machine and gradually withdraws the foraminous sleeve 6 from the extruder nozzle 4. At the same time the plastice coating or pipe forming material 7 is extruded into the annular space formed between the exterior of the pipe 2 and the foraminous sleeve 6.

As the material 7 is thus extruded around the pipe and within the foraminous sleeve, a considerable amount of the surplus moisture is absorbed by the sleeve and the latter is placed under tension owing in part to the pressure of the plastic or cementitious material entering the space between the pipe and the sleeve, and also to the longitudinal movement of the sleeve as it is withdrawn from the nozzle of the extruder with the pipe.

It has been found advantageous to have the warp and weft strands or threads of the foraminous sleeve extending diagonally or substantially helically in relation to the length of the pipe or mandrel as distinct from parallel and transversely thereto. To this end the sleeve may be constructed (as indicated in Figure 3) from a strip 6c of hessian or other suitable foraminous material, which is cut on the bias and wound spirally onto a suitable former 5, the adjoining convolutions being secured together as by sewing 6d. Alternatively the fabric forming the sleeve may be woven so that the strands extend diagonally of the pipe or mandrel as aforesaid.

Such a formation of the foraminous sleeve renders it more readily extensible or elastic and enables it to be more readily contracted in concertina fashion so as to occupy a relatively short space upon the extruder nozzle preparatory to the pipe coating or forming operation. Furthermore, the diagonal disposition of the strands or threads of the foraminous sleeve has the effect of causing the sleeve to contract in diameter, as indicated at 6e in Figure 4, when the sleeve is placed under tension in a lengthwise direction. This property of the sleeve to contract in diameter under the influence of tension is utilized in accordance with the invention to impart moulding pressure to the plastic material whereby the material is uniformly compressed against the pipe so that an intimate contact or adhesion is ensured and the moulded body is unlikely to crack or to break away from the pipe.

In addition, the diagonal disposition of the strands or threads of the sleeve 6 reduces the tension on the threads when they become adhered to the plastic or cementitious material with the result that the sleeve more readily accommodates itself to the external diameter of the extruded material around the pipe or mandrel.

Before extruding the plastic material around the pipe or mandrel, the foraminous sleeve 6 may be placed directly around the extruder nozzle 4 in a collapsed concertina fashion as indicated in Figure 1, or it may be similarly positioned upon a removable thin sheet metal tube (not shown) which may be then slipped onto the nozzle. By using several of such tubes the sleeves 6 may be placed thereon in a contracted state so that the tubes carrying the collapsed sleeves may be readily slipped onto the extruder nozzle ready for the coating or forming of each successive pipe or the like. The delay which would otherwise be entailed in drawing one of the foraminous sleeves onto the extruder nozzle after the completion of each pipe coating or forming operation may be thus obviated.

The forward end of the foraminous sleeve is suitably attached to the forward portion of the pipe before commencing the extrusion process, and in order to suitably retard too free withdrawal of the sleeve and to place it under tension in a lengthwise direction while it is being withdrawn from the extruding nozzle onto the plastic material which is being extruded around the pipe in advance of the nozzle, a suitable tensioning member is preferably disposed around the nozzle 4 near its forward or discharge end so as to exert a yielding pressure upon the sleeve as it is travelling forwardly with the pipe.

This tensioning member may consist of a rigid frame 8 carrying a rubber or like yielding ring 9 the inner edge of which presses against the foraminous sleeve 6 adjacent the forward portion of the extruding nozzle. Thus a considerable proportion of any surplus moisture that may be present in plastic materials such as cement asbestos mixtures will either be absorbed by the hessian or like sleeve or will percolate therethrough and escape.

The extruding machine may, as shown in Figure 1, include a hopper 11 into which the plastic material 7 is introduced and from which it may be fed under pressure, through an opening 12, formed near the bottom and at one side of the hopper, and through the extruding nozzle 4 into the annular space between the sleeve 6 and the pipe. The requisite pressure may be exerted upon the plastic material by suitable means, such, for instance, as a plunger 13 arranged within the hopper and acted upon by a weighted lever (not shown) or any other appropriate device. Alternatively, a screw feeding device may be arranged to force the material continuously from the hopper 11 through the extruding nozzle.

When a bituminous coating material or mixture is to be applied to the pipe or mandrel, suitable heating means, such as a steam or like heating jacket 16, may be arranged around the hopper 11 and around the rear or inner end portion 4a of the extruding nozzle 4 to maintain the bituminous material or mixture in the desired plastic state. This rear portion 4a of the nozzle may be tapered so as to converge towards the outer or front portion thereof which is preferably cylindrical and is adapted to gauge the thickness of the plastic layer which is applied around the pipe or mandrel.

Extending through the hopper of the extruding machine is a tubular guide 17 through which the pipe 2 is fed by suitable means, such, for instance, as a wheeled carriage 18, indicated diagrammatically in Figure 2, actuated by screw and nut gear, an endless chain or other appropriate means (not shown).

The tubular guide 17 is of somewhat larger internal diameter than the external diameter of the pipe 2 which may be maintained concentrically within the guide by suitable means, such as spring fingers 19, secured to the exterior of the guide 17 at three or more circumferentially spaced intervals, and provided with inwardly bent end portions 19a projecting inwardly through openings 17a in the tubular guide and yieldingly engaging the pipe so that the latter, while travelling through the guide, will be supported concentrically therein.

The forward portion of the tubular guide 17 may project into the rear tapered portion 4a of nozzle 4 within which the guide may be centralized by means of circumferentially spaced projections 21 which do not obstruct the passage of the plastic material through the nozzle.

In the coating or forming of plain ended pipes, the metal pipe to be coated, or the mandrel upon which the cementitious pipe is to be formed, may be fed through the extruding machine 3 from the rear thereof by means of the wheeled carriage or other feeding mechanism, and before the rear end of the pipe or mandrel has emerged from the forward end of the tubular guide 17, the next pipe or mandrel is inserted into the latter in order to push the first pipe or mandrel out of the guide 17 and the extruding nozzle 4 so that the application of the coating material thereto is completed. The forward portion of the following pipe or mandrel which abuts against the rear end of the first pipe or mandrel then passes through the extruding nozzle 4 so that the abutting pipes or mandrels form, in effect, a continuous core or support to prevent the plastic material from collapsing within the extruding nozzle 4 in front of the tubular guide 17 which similarly supports the plastic material under pressure within the hopper 11 of the extruding machine.

In cases where an enlarged socket or faucet portion is formed at one end of the pipe or mandrel, and it is accordingly not possible to pass such socket or faucet through the extruding machine, a short length of plain-ended pipe or the like, which acts as a dummy, may be inserted into the tubular guide 17 and the front end of this dummy section may be temporarily connected to the plain or unenlarged rear end of the pipe or mandrel about which the plastic material is to be moulded. The pipe or mandrel and the dummy section are then moved rearwardly through the extruder until the socket or faucet portion at the forward end of the pipe or mandrel is disposed adjacent the front or discharge end of the extruding nozzle. The front end of the foraminous sleeve 6 is then attached to the socket or faucet portion of the pipe or mandrel and the latter is fed forwardly through the extruder so that the foraminous sleeve is drawn off the nozzle and the material is extruded around the pipe or mandrel and within the foraminous sleeve as aforesaid.

When the rear end of the pipe or mandrel emerges from the tubular guide into the extruding nozzle, the dummy section of piping or the like connected thereto moves forwardly through the nozzle, thus preventing the collapse of the plastic material therein and maintaining it in the desired annular form until the next pipe or mandrel is ready for insertion into the extruder.

The application of plastic material around the socket or faucet end of the coated pipe or mandrel may be effected by trowelling or moulding in any suitable manner after the completion of the extruding operation.

Figures 5, 6 and 7 illustrate a modified, and in many cases a preferred, form of the invention according to which the plastic material flows by gravity, or, if desired under positive pressure, downwardly into an annular space formed bebetween the foraminous sleeve and a pipe or mandrel, which, in this case occupies a substantially vertical attitude during the moulding operations. The pipe 2 or the like to be coated is passed vertically through a feed hopper 11a having a depending tubular extension or discharge nozzle 4b which surrounds the pipe and forms an annular space of suitable width between the exterior of the pipe and the wall of the nozzle 4b.

The pipe may be centralized within the said nozzle or hopper extension by any suitable means and the foraminous sleeve 6, contracted in concertina fashion, may be arranged around the nozzle, and be suitably attached at its lower end to the lower end of the pipe so that as the latter moves downwardly, and the plastic material travels by gravity, the sleeve is withdrawn from the depending nozzle with the downwardly moving pipe.

In order to progressively compress cementitious or like material around the pipe or mandrel and to extract surplus moisture from the material, a die member 22 which surrounds the foraminous sleeve and the pipe adjacent the lower end of the discharge nozzle 4b is of tapered internal formation so that its interior, which is adapted to contact with the foraminous sleeve adjacent the point where the cementitious or like material is introduced into the space between the sleeve and the pipe or mandrel, converges downwardly from the discharge end of the nozzle.

The die member may comprise a plurality of alternate rings or layers 23 of resilient material such as rubber, and intervening layers 24 of non-resilient material such as wood or metal. The internal diameter of these resilient rings 23 progressively decreases towards the lower end of the die and the inner edges of the resilient rings contact with the foraminous sleeve, so that as the latter is tensioned and withdrawn downwardly through the die, its diameter correspondingly decreases from that of the collapsed portion of the sleeve around the nozzle to the desired external diameter of the finished coating of plastic material around the pipe or mandrel.

The die is provided with suitable means, such as vent or drainage apertures 25 formed in the non-resilient rings 24, to permit of the surplus moisture escaping from the cementitious or like material as it is squeezed or compressed between the foraminous sleeve and the pipe or mandrel. The material is thus converted from the relatively wet or semi-liquid consistency which permits it to readily flow downwardly from the hopper through the discharge nozzle and into the space between the foraminous sleeve and the pipe or mandrel, to the consistency of a relatively stiff paste as it is compressed against the pipe or mandrel by the tapering and resilient die and by the sleeve 6.

The die 22 may be suspended from the hopper 11a or other convenient support or may rest removably upon a support such as 26, so that the die may be readily removed to permit of the collapsed foraminous sleeve being positioned around the nozzle or extension of the hopper preparatory to the pipe coating or forming operation.

In cases where a bituminous material or mixture is used as the pipe coating or forming material, a charge of the material may be introduced in a heated condition into the hopper 11a (Figure 7) and the hopper, and also the discharge nozzle 4b, may be steam jacketted in order to maintain the material at a desirable temperature.

Furthermore in the application of such bituminous coatings, the metal pipe is preferably first heated and a preliminary coating of tar or the like is applied to the external surfaces thereof, for instance, by dipping the heated pipe in a tar bath. The tar coated pipe is then permitted to cool whereupon the bitumastic material, such as a mixture of asbestos and bitumen, is applied in the manner described.

The die member to be used when dealing with bituminous material may consist primarily of a funnel or an inverted conical shaped member 22a (Figure 7) of sheet metal or the like and be devoid of the vent or drainage apertures that are formed in the die member for dealing with cementitious material.

In order to bring about relatively quick cooling and setting of a bituminous or like body around the pipe or mandrel a water tank 27 may be arranged immediately beneath the die member as indicated in Figure 7 so that the bituminous body is, as soon as possible after being moulded progressively immersed in the water and thus cooled.

Metal pipes that have been coated with cementitious material such as a cement-asbestos mixture in accordance with the invention, are preferably placed within a steaming or heating chamber as soon as possible after the coating has been applied, and before it has set. The heat thus applied to the coated pipe not only assists to season the cementitious material but also causes the metal pipe to expand so that when the metal pipe has contracted through cooling, the cementitious coating will set in such a manner that it is not liable to crack or become fractured due to subsequent expansion of the metal pipe under varying atmospheric conditions when in use. This heating of the coated metal pipes before the cementitious coating mixture has been allowed to set, constitutes a feature of the invention.

A similar treatment as referred to in the last preceding paragraph may be applied to bituminous coated pipes in order to assist the fusion or adhesion of the coating to the pipe. In addition the heated pipe may be rotated while it is cooling in order to prevent any possible undesired running of the bituminous body.

According to a further aspect of the invention, provision is made whereby a metal reinforcement, such as the usual wire cage or the like, may be embedded within the cementitious material around the pipe whilst the cementitious material is being compacted within the foraminous sleeve, as indicated, for example, in Figure 5.

The invention thus permits of the manufacture of metal reinforced pipes, or pipe coatings of asbestos and cement or like material which are capable of resisting high pressures, particularly internal pressures, in the case of asbestos-cement or like pipes moulded upon a mandrel in accordance with the invention. In such cases the relative content of asbestos may be reduced so that it serves merely to bind and strengthen the cement mixture whilst the metal reinforcement serves to resist the stresses set up by internal pressure, thus providing a product which is much stronger than the ordinary asbestos-cement pipe.

According to this aspect of the invention, the metal reinforcement in the form of the usual wire cage or the like 29, is slipped over the collapsible mandrel upon which the cementitious pipe is to be moulded or over the metal pipe to which the cementitious coating is to be applied, before the pipe or mandrel is passed through the die member 22.

Any suitable means may be employed to maintain the reinforcement concentrically around the pipe or mandrel. For example, a plurality of spacing members or strips 31 of metal or other suitable material may be arranged between the pipe or mandrel and the interior of the reinforcing cage. These spacing members are stationarily supported at intervals around the pipe or mandrel by means of a suitable support, such, for example, as a series of rods 32, which extend upwardly and may be connected at their upper ends to a supporting structure (not shown) arranged above the feed hopper 11a so that the spacing members may extend downwardly into said hopper to guide the reinforcement concentrically therethrough.

The spacing members 31 terminate above the die 22 but the reinforcement 29 is guided by the spacing members through the die and into the foraminous sleeve so that, as the cementitious material is compacted around the pipe or mandrel and within the foraminous sleeve, the metal reinforcement is embedded concentrically therein whilst the reinforcement moves downwardly or forwardly with the pipe or mandrel and the foraminous sleeve.

As the pipe or mandrel thus moves downwardly or forwardly through the die and the cementitious material is compacted thereon, the portion of the reinforcement which is embedded in the moulded pipe or coating will assist to maintain the reinforcement concentrically in position whilst it moves forwardly along the spacing members which keep the upper or rear portion of the reinforcement concentrically spaced until it has been withdrawn completely from the spacing members.

Reinforcement may be similarly incorporated during the pipe forming or coating operations as described with reference to Figures 1 and 2. In such case suitable means, such as spacing members or strips equivalent to those designated by the numeral 31 in Figure 5, may be arranged to guide the reinforcement concentrically through the extrusion nozzle 4 and into the foraminous sleeve 6 so that the reinforcement is embedded in the cementitious material as the latter is compacted around the pipe or mandrel during its forward movement.

It will be apparent from the foregoing that the foraminous sleeve 6 plays an important part in the method and constitutes an important feature of the invention. It not only effects or assists the moulding and compression of the plastic material but, in the case of cementitious or like mixtures, absorbs or permits the exudation and escape of a considerable amount of surplus water. Furthermore, the sleeve becomes intimately united or adhered to the outer surface of the moulded annular body of plastic material and, constitutes an outer reinforcement and protective layer that strengthens the pipe or coating and protects it from damage during handling, transport and actual use.

It will, of course, be understood that in the moulding of cementitious pipes or the like, the metal pipe 2 shown in the drawings would be replaced by a mandrel which would be collapsed or freed from the moulded pipe and withdrawn therefrom so as to leave the moulded pipe encased within the foraminous sleeve.

It is also to be understood that in the embodiments illustrated in Figures 5, 6 and 7 the gravitational flow of the plastic material into the annular space between the foraminous sleeve and the pipe (or mandrel) may be assisted, or even replaced, by a positive pressure feed, as, for example, by closing the hopper 11a at its top and admitting compressed air into the hopper above the level of the plastic material therein. A similar positive pressure feed could also be adopted

Having now described my invention what I claim as new and desire to secure by Letters Patent is:

1. In apparatus for the coating and manufacture of pipes with and from plastic materials, a sleeve formed of flexible foraminous material adapted to be secured at one end to one end of a pipe or mandrel and to extend lengthwise thereof in order to provide, in association with such pipe or mandrel, an annular moulding space for the reception of plastic material, said sleeve being capable of being placed in tension in order to effect compression of the plastic material against a surface of a pipe or mandrel, the warp and weft strands of the material composing said sleeve extending substantially diagonally or helically in relation to the length of the sleeve.

2. In apparatus for the coating and manufacture of pipes with and from plastic materials, a sleeve formed of flexible foraminous material adapted to be secured at one end to one end of a pipe or mandrel and to extend lengthwise thereof in order to provide, in association with such pipe or mandrel, an annular moulding space for the reception of plastic material, said sleeve being capable of being placed in tension in order to effect compression of the plastic material against a surface of a pipe or mandrel, said sleeve being formed from a strip of textile material that is cut on the bias and wound helically into substantially cylindrical form, the adjacent edges of adjoining convolutions being secured together as by sewing.

3. A method for coating and manufacturing pipes and the like from cementitious, bituminous or other suitable plastic materials; which comprises attaching a flexible sleeve of extensible foraminous material to one end of a pipe or a mandrel, arranging the sleeve to extend loosely around said pipe or mandrel so as to provide in association therewith an annular space, introducing the plastic material into said annular space and causing the material to travel towards that end of the pipe or mandrel to which the sleeve is attached, moving the pipe or mandrel in the same direction as the feed of the plastic material and restraining free movement of the flexible sleeve so that it is progressively placed under tension from its attached end by and during movement of the pipe or mandrel thereby progressively reducing the diameter of said sleeve, whereby an annular body of the plastic material is progressively built up in a lengthwise direction within said annular space and is compressed between said sleeve and the adjacent surface of said pipe or mandrel.

4. A method according to claim 3, wherein the plastic material is extruded in a hollow conical stream from a supply and said stream forced into the annular moulding space.

5. A method according to claim 3, wherein said foraminous sleeve is at the commencement of operations contracted in bellows formation around the pipe or mandrel, and during the moulding operation, is gradually extended lengthwise from its contracted condition into substantially cylindrical condition.

6. A method according to claim 3 characterized by subjecting the foraminous sleeve while it is moving with said pipe or mandrel to an external circumferential pressure.

7. A method according to claim 3 as applied to the coating of metal pipes, characterized by subjecting the pipes, prior to the setting of the coating material thereon, to heat treatment to cause the metal pipe to expand.

8. A method according to claim 3 as applied to the coating of metal pipes with bituminous materials, wherein the metal pipe, preparatory to the coating operation, is heated and given a surface coating of a material aiding the adhesion of the bituminous coating, and is allowed to cool before being coated with the bituminous material.

9. A method in accordance with claim 3 wherein the pipe or mandrel and said sleeve are arranged in an upstanding attitude during the moulding operation and wherein the coating material flows by gravitation into the annular space.

10. A method as claimed in claim 3 wherein the pipe or mandrel and said sleeve are arranged in an upstanding attitude during the moulding operation and wherein the coating material flows by gravitation into the annular space and wherein said gravitational flow of the coating material is assisted by fluid pressure.

11. A method according to claim 3, wherein the plastic material is extruded downwardly in a hollow conical stream from a supply and said stream forced into the annular moulding space; and wherein the foraminous sleeve is subjected around said conical stream to a resilient external circumferential pressure which increases downwardly.

12. A method according to claim 3 as applied to the coating of metal pipes with bituminous materials, wherein the metal pipe preparatory to the coating operation is heated and given a surface coating of a material aiding the adhesion of the bituminous coating, and is allowed to cool before being coated with the bituminous material, and wherein the coated pipe, or mandrel, as soon as practicable after it has been coated, is subjected to cooling treatment in order to expedite setting of the coating.

13. A method according to claim 3 as applied to the coating of metal pipes with bituminous materials, wherein the metal pipe preparatory to the coating operation is heated and given a surface coating of a material aiding the adhesion of the bituminous coating, and is allowed to cool before being coated with the bituminous material, and wherein the coated pipe, or mandrel, as soon as practicable after it has been coated, is subjected to cooling treatment in order to expedite setting of the coating, said coated pipe or mandrel as it moves downwardly being progressively immersed in a body of water.

14. A method according to claim 3 including the step of incorporating metallic reinforcement in the annular body of plastic material during the moulding thereof.

15. A method according to claim 3 characterized by applying a cage-like metal reinforcement about the pipe or mandrel and causing the reinforcement to extend into the annular moulding space, and supporting the reinforcement in relation to the pipe or mandrel and the foraminous sleeve while the reinforcement is gradually embedded in the annular body as the latter is progressively moulded.

16. In apparatus for the coating and manufacture of pipes with and from plastic materials in combination with a pipe or mandrel, a flexible foraminous sleeve composed of elastic textile material and adapted to be attached at one end to said pipe and mandrel and so constructed as to be capable of being contracted into bellows formation and of being extended and reduced in diameter and placed in sufficient tension to apply compression effort on the plastic material between said sleeve and the surface of the pipe or mandrel.

17. Apparatus for the coating and manufacture of pipes and like bodies with plastic materials comprising a pipe or mandrel, a sleeve formed of flexible foraminous elastic textile material adapted to be secured at one end to one end of said pipe or mandrel and to extend lengthwise exteriorly thereof in a loose condition in order to provide an annular moulding space, means for moving said pipe or mandrel with the sleeve attached thereto in a lengthwise direction, means for progressively placing said sleeve under tension and thereby progressively reducing its diameter, and means for feeding plastic material lengthwise into said annular moulding space.

18. Apparatus according to claim 17 wherein the means for feeding the plastic material into the annular moulding space comprises an extruder device provided with a discharge nozzle around which said sleeve is loosely applied preparatory to commencement of the extrusion of the plastic material into the moulding space.

19. Apparatus according to claim 17, wherein the means for feeding the plastic material into the annular moulding space comprises an extruder device provided with a discharge nozzle around which said sleeve is loosely applied preparatory to commencement of the extrusion of the plastic material into the moulding space, and a ring member encircling said extruder nozzle and adapted to yieldingly engage said foraminous sleeve and place same under tension.

20. Apparatus according to claim 17 wherein the feeding means comprises a hopper for containing a supply of the plastic material, a discharge nozzle projecting from said hopper, means for guiding the pipe or mandrel in its passage through the hopper and the discharge nozzle, and means for forcing the plastic material from the hopper through said nozzle while the pipe or the mandrel and said foraminous sleeve are moving in the same direction as the plastic material.

21. Apparatus for the coating and manufacture of pipes and like bodies with plastic materials comprising a hopper for containing a supply of the plastic material, a discharge nozzle depending from said hopper, means whereby a pipe or mandrel may be passed vertically through the hopper and the nozzle, a flexible foraminous extensible sleeve adapted for attachment to the lower end of said pipe or mandrel and capable of extending upwardly and loosely around said nozzle, an internally tapering die member surrounding the lower part of said sleeve and adapted to subject it to pressure that increases downwardly, means for moving the pipe or mandrel through said die member in the same direction as the feed of the plastic material, and means for restraining the free movement of the flexible sleeve so that it is progressively placed under tension from its attached end and reduced in diameter.

22. Apparatus according to claim 21 wherein said die member comprises a plurality of alternate rings of resilient material and intervening rings of non-resilient material, the internal diameter of the resilient rings progressively decreasing towards the lower end of the die member.

23. Apparatus according to claim 21 wherein said die member comprises a plurality of alternate rings of resilient material and intervening rings of non-resilient material, the internal diameter of the resilient rings progressively decreasing towards the lower end of the die member, said non-resilient rings being provided with passages arranged to drain off surplus moisture exuded from the plastic material during the moulding operation.

WALTER REGINALD HUME.